US012370839B2

(12) United States Patent
Meguro

(10) Patent No.: US 12,370,839 B2
(45) Date of Patent: Jul. 29, 2025

(54) TIRE

(71) Applicant: Sumitomo Rubber Industries, Ltd., Kobe (JP)

(72) Inventor: Yuya Meguro, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 18 days.

(21) Appl. No.: 17/889,208

(22) Filed: Aug. 16, 2022

(65) Prior Publication Data
US 2023/0070741 A1 Mar. 9, 2023

(30) Foreign Application Priority Data
Sep. 7, 2021 (JP) ................... 2021-145688

(51) Int. Cl.
B60C 11/13 (2006.01)
B60C 11/04 (2006.01)
B60C 11/03 (2006.01)

(52) U.S. Cl.
CPC .......... B60C 11/1307 (2013.01); B60C 11/04 (2013.01); B60C 11/1369 (2013.01);
(Continued)

(58) Field of Classification Search
CPC ....... B60C 2011/133; B60C 2011/0381; B60C 2011/0383; B60C 11/1307; B60C 11/1376; B60C 11/1392; B60C 11/13
See application file for complete search history.

(56) References Cited

U.S. PATENT DOCUMENTS 5,031,680 A * 7/1991 Kajikawa ............... B60C 11/033
152/902
5,355,922 A * 10/1994 Kogure .................... B60C 9/26
152/526

(Continued)

FOREIGN PATENT DOCUMENTS

DE 102012105403 A1 * 12/2013 ......... B60C 11/0306
EP 3 747 672 A1 12/2020
(Continued)

OTHER PUBLICATIONS

JP 2013-169886 Machine Translation, Sakurai, Taro (Year: 2013).*
DE 102012105403 Machine Translation, Rlttweger, Stefan (Year: 2013).*

Primary Examiner — Katelyn W Smith
Assistant Examiner — Nicholas J Weiler
(74) Attorney, Agent, or Firm — Birch, Stewart, Kolasch & Birch, LLP

(57) ABSTRACT

A tire includes a tread portion being provided with a first circumferential groove extending continuously in the tire circumferential direction, and a first land portion adjacent to the first circumferential groove. The first land portion includes a ground contact surface, a land sidewall on a first circumferential groove side, and a recess that opens across both the ground contact surface and the land sidewall. The recess has an opening defined by a V-shaped first edge and a V-shaped second edge respectively extending on the ground contact surface and the land sidewall. The recess has a circumferential maximum length L1 of from 6.0 to 9.0 mm. The recess has a maximum depth d1 of from 15% to 40% of a maximum depth of the first circumferential groove. The recess has an axial maximum length L2 of from 3.0 to 5.0 times the depth d1.

17 Claims, 5 Drawing Sheets

(52) U.S. Cl.
CPC ... *B60C 11/1392* (2013.01); *B60C 2011/0381* (2013.01); *B60C 2011/133* (2013.01)

(56) References Cited

U.S. PATENT DOCUMENTS

| | | | | |
|---|---|---|---|---|
| 2005/0103414 A1* | 5/2005 | Suzuki | ............... | B60C 11/12 152/209.15 |
| 2012/0145295 A1* | 6/2012 | Yamada | ............... | B60C 11/12 152/209.1 |
| 2014/0230983 A1* | 8/2014 | Tagashira | ............ | B60C 11/033 152/209.25 |
| 2016/0009141 A1* | 1/2016 | Suga | ............... | B60C 11/04 152/209.9 |
| 2016/0152093 A1* | 6/2016 | Sakiyama | ............ | B60C 11/0323 152/209.1 |
| 2017/0050470 A1* | 2/2017 | Kanematsu | ............ | B60C 11/1384 |
| 2019/0291515 A1* | 9/2019 | Kawasaki | ............ | B60C 11/1204 |
| 2020/0391556 A1* | 12/2020 | Yokokawa | ............ | B60C 11/0306 |

FOREIGN PATENT DOCUMENTS

| | | | |
|---|---|---|---|
| JP | 2013169886 A | * | 9/2013 |
| JP | 2020-200018 A | | 12/2020 |

\* cited by examiner

TIRE

RELATED APPLICATIONS

This application claims the benefit of foreign priority to Japanese Patent Application No. JP2021-145688, filed Sep. 7, 2021, which is incorporated by reference in its entirety.

FIELD OF THE DISCLOSURE

The present disclosure relates to a tire.

BACKGROUND OF THE DISCLOSURE

Patent Document 1 below has proposed a tire with improved steering stability on a dry road surface by specifying main grooves extending continuously in the tire circumferential direction and lateral grooves extending in the tire axial direction.

Patent Document

[Patent document 1] Japanese Unexamined Patent Application Publication 2020-200018

SUMMARY OF THE DISCLOSURE

In recent years, as the performance of vehicles has improved, further improvement in steering stability has been required for tires. On the other hand, tires are also required to ensure wet performance.

The present disclosure has been made in view of the above circumstances, and has a main object to provide a tire capable of improving steering stability on dry road surfaces while maintaining wet performance.

In one aspect of the present disclosure, a tire includes a tread portion being provided with a first circumferential groove extending continuously in a tire circumferential direction, and a first land portion adjacent to the first circumferential groove, the first land portion including a ground contact surface, a land sidewall on a first circumferential groove side, and at least one recess that opens across both the ground contact surface and the land sidewall, wherein the at least one recess has an opening defined by a V-shaped first edge and a V-shaped second edge respectively extending on the ground contact surface and the land sidewall, the at least one recess has a maximum length L1 in the tire circumferential direction of from 6.0 to 9.0 mm, the at least one recess has a maximum depth d1 of from 15% to 40% of a maximum depth of the first circumferential groove, and the at least one recess has a maximum length L2 in a tire axial direction of from 3.0 to 5.0 times the depth d1.

DETAILED DESCRIPTION OF THE DISCLOSURE

Hereinafter, an embodiment of the present disclosure will be described with reference to the drawings.

Figure 1:
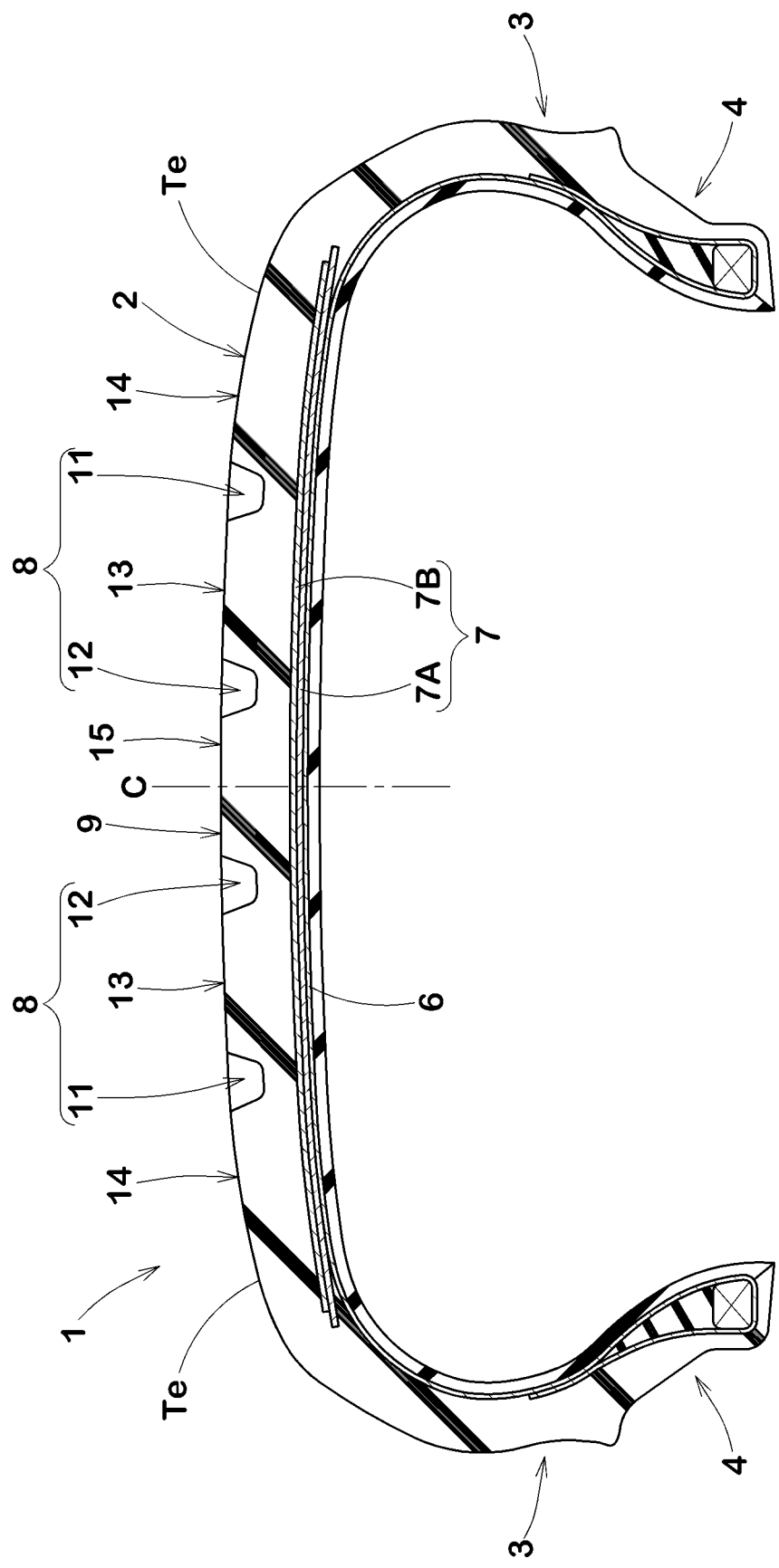
FIG. 1 is a meridian cross-sectional view showing an embodiment of a tire in accordance with the present disclosure.

FIG. 1 is a meridian cross-sectional view showing an embodiment of a tire 1 under a normal state in accordance with the present disclosure. As shown in FIG. 1, the present disclosure may preferably be applied to a pneumatic tire for passenger car, for example. However, the present disclosure is not limited to such an embodiment, and the present disclosure may be applied to, for example, tires for motorcycle and heavy loads.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is a non-pneumatic tire, the normal state is a standard state of use according to the purpose of use of the tire and means a state of no load. As used herein, unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

Tire components such as a carcass 6 and a belt layer 7 are arranged inside the tire 1 according to the present embodiment. For these tire components, conventional aspects are appropriately adopted.

The tire 1 includes a tread portion 2, a pair of sidewall portions 3, a pair of bead portions 4, the carcass 6 extending from one of the bead portions 4 to the other one of the bead portions 4 through one of the sidewall portions 3, the tread portion 2, and the other one of the sidewall portions 3, and the belt layer 7. In the present embodiment, the carcass 6, for example, is composed of a single carcass ply. The carcass ply, for example, includes a plurality of organic fiber carcass cords oriented at an angle of from 75 to 90 degrees with respect to the tire circumferential direction.

The bely layer 7, for example, is composed of two bely plies 7A and 7B. Each of the belt plies 7A and 7B, for example, includes a plurality of belt cords oriented at an angle of from 10 to 45 degrees with respect to the tire circumferential direction. As the belt cords, for example, organic fiber cords and steel cords may be adopted as appropriate. In other embodiments, a tread reinforcing layer such as a band layer may be further arranged on radially outwardly of the belt layer 7.

In the present embodiment, the tread portion 2 is provided with a plurality of circumferential grooves 8 extending continuously in the tire circumferential direction. In the present embodiment, the circumferential grooves 8 provided on the tread portion 2 include two first circumferential grooves 11 and two second circumferential grooves 12. One of the first circumferential grooves 11 is provided between the tire equator C and one of the tread edges Te, and the other one of the first circumferential grooves 11 is provided between the tire equator C and the other one of the tread edges Te. The second circumferential grooves 12 are located between the first circumferential grooves 11 such that the tire equator C is located therebetween. Thus, the first circumferential grooves 11 are located on the respective tread edges Te side, and the second circumferential grooves 12 are located on the inside of the first circumferential grooves 11 in the tire axial direction.

As used herein, the tread edges Te are the axial outermost edges of the ground contact surface of the tire 1 which occurs under the condition such that the tire 1 under the normal state is grounded on a plane with a 70% of the standard tire load at zero camber angles.

As used herein, when a tire is a pneumatic tire based on a standard, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. If a tire is not based on the standards, the "standard tire load" refers to the maximum load that can be applied when using the tire in accordance with the above-mentioned standards.

The tread portion 2 includes a plurality of land portions 9 which is divided by the circumferential grooves 8. In the present embodiment, the land portions 9 include first land portions 13, second land portions 14 and a third land portion 15. The first land portions 13 are adjacent to the first circumferential grooves 11. Specifically, the first land portions 13 are demarcated between the first circumferential grooves 11 and the second circumferential grooves 12. The second land portions 14 are adjacent to the first land portions 13 via the first circumferential grooves 11. The second land portions 14 are arranged outwardly in the tire axial direction of the first land portions 13 to include the tread edges Te. The third land portion 15 is demarcated between the second circumferential grooves 12. Note that the present disclosure is not limited to the above-mentioned embodiment as long as the tread portion 2 includes at least one first circumferential groove 11 and at least one first land portion 13 adjacent thereto.

Figure 2:
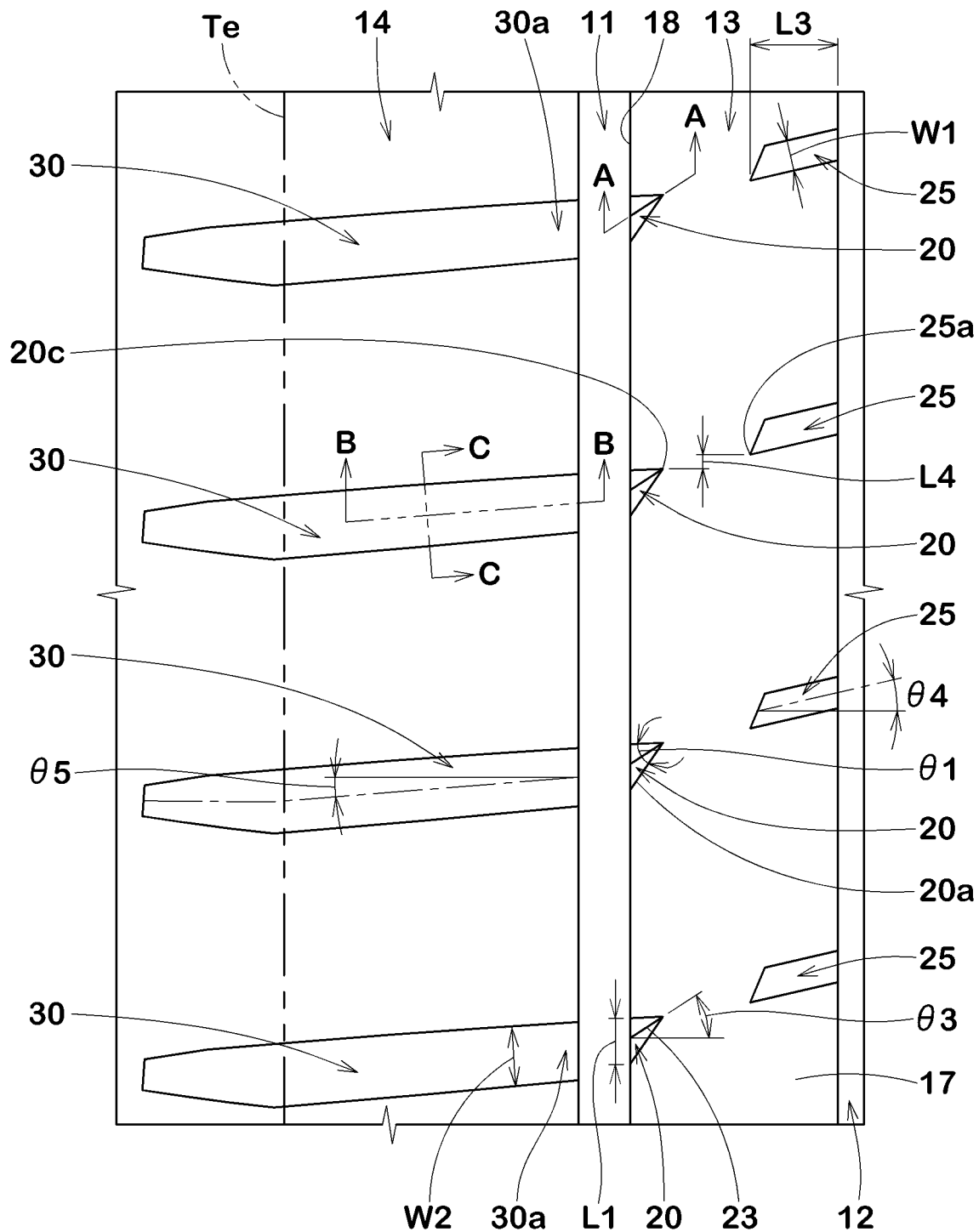
FIG. 2 is an enlarged plan view of a first land portion, a second land portion and a first circumferential groove of FIG. 1.
Figure 3:
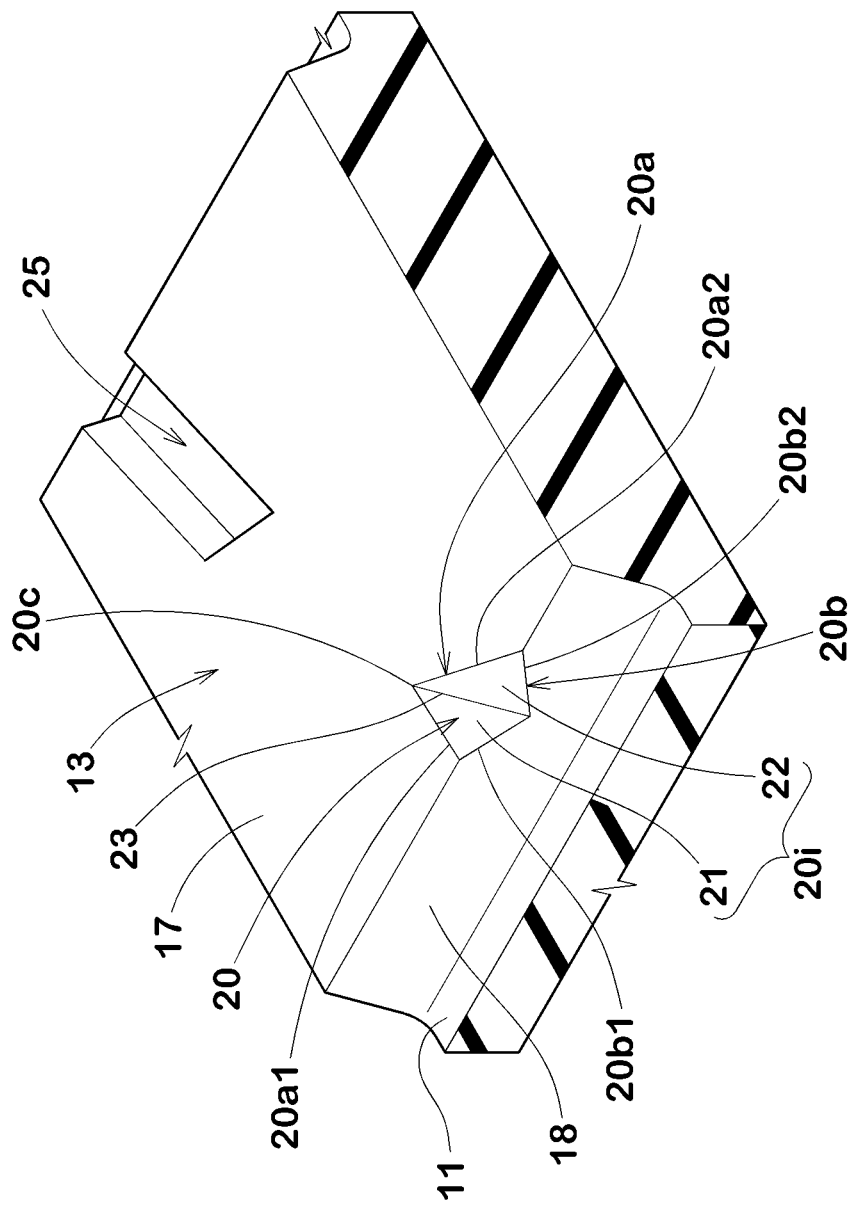
FIG. 3 is an enlarged perspective view of the first land portion.

FIG. 2 illustrates an enlarged plan view of one of the first land portions 13, one of the second land portions 14 and one of the first circumferential grooves 11. FIG. 3 is an enlarged perspective view of the first land portion 13. As illustrated in FIG. 2 and FIG. 3, the first land portion 13 includes a ground contact surface 17, a land sidewall 18 on the first circumferential groove 11 side, and at least one recess 20 that opens across both the ground contact surface 17 and the land sidewall 18.

As illustrated in FIG. 3, the at least one recess 20 has an opening defined by a V-shaped first edge 20a and a V-shaped second edge 20b respectively extending on the ground contact surface 17 and the land sidewall 18. The first edge 20a of the recess 20 is a ridge formed by the ground contact surface 17 of the first land portion 13 and the inner surface 20i of the recess 20. The second edge 20b of the recess 20 is a ridge formed by the land sidewall 18 of the first land portion 13 and the inner surface 20i of the recess 20. Since the tire 1 is a rubber product, the ridges may have a minute width in the cross section in the direction orthogonal to the length direction thereof. Further, the ridges may be microscopically curved in the cross section. In this case, the width of the ridges is preferably equal to or less than 1.0 mm, more preferably equal to or less than 0.5 mm. If the ridges have a width, each dimension of the recess 20 described below shall be measured at the center of the width of the ridges.

As illustrated in FIG. 2, the recess 20 has a maximum length L1 in the tire circumferential direction of from 6.0 to 9.0 mm.

Figure 4:
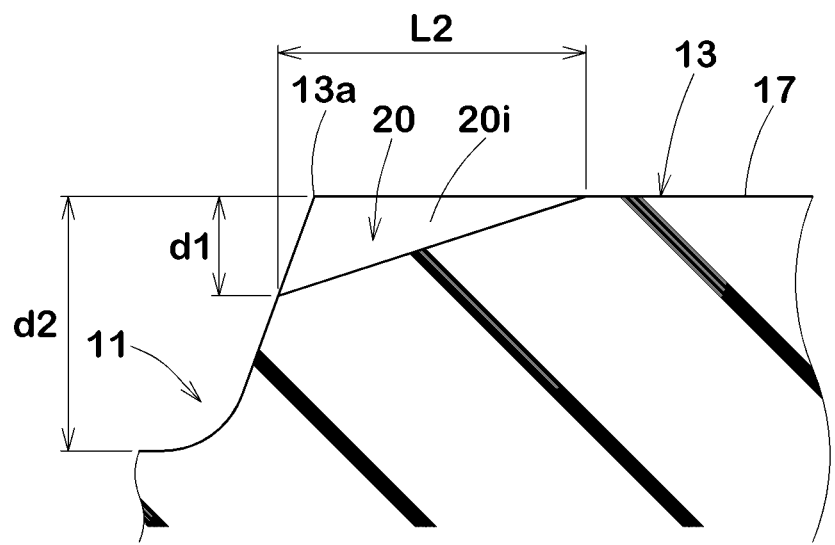
FIG. 4 is a cross-sectional view taken along the line A-A of FIG. 2.

FIG. 4 illustrates a cross-sectional view taken along the line A-A of FIG. 2. As illustrated in FIG. 4, the recess 20 has a maximum depth d1 of from 15% to 40% of a maximum depth d2 of the first circumferential groove 11. Further, the recess 20 has a maximum length L2 in the tire axial direction of from 3.0 to 5.0 times the maximum depth d1.

By adopting the above-mentioned configuration, the present disclosure can improve steering stability on dry road surfaces (hereinafter, may be simply referred to as "steering stability") while maintaining the wet performance. The following mechanism can be inferred as the reason.

The recess 20 whose shape and dimensions are specified as described above can be appropriately deformed when the ground pressure is applied to the first land portion 13, and the inner surface 20i of the recess 20 can be grounded. Thus, it is possible to suppress that excessively high ground pressure acts on the vertical edge 13a of the first land portion 13. Accordingly, problems such as the ground contact surface 17 of the first land portion 13 being locally lifted can be suppressed, and a large grip force can be provided.

Further, the recess 20 according to the present disclosure does not excessively impair the rubber volume of the first land portion 13 while exerting the above-mentioned effect. Thus, the rigidity of the first land portion 13 can be maintained, which further improves the steering stability.

Furthermore, the recess 20 having the above-mentioned shape and dimensions can efficiently guide the water pushed by the ground contact surface 17 of the first land portion 13 to the first circumferential groove 11 side during wet driving, and can maintain the wet performance. For this reason, the tire 1 according to the present disclosure can improve the steering stability while maintaining the wet performance.

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

As illustrated in FIG. 2, the first land portion 13 is not provided with any lateral grooves that extend across the first land portion 13 completely in the tire axial direction. Thus, the ground contact surface 17 of the first land portion 13 extends continuously in the tire circumferential direction over the entire circumference of the tire. Such a first land portion 13 has high rigidity and can exert excellent steering stability.

In the present embodiment, the first land portion 13 is provided with a plurality of recesses 20 spaced in the tire circumferential direction. A pitch length of the plurality of recesses 20 in the tire circumferential direction, for example, is in a range from 4.0 to 8.0 times the length L1 of the tire circumferential direction of the recesses 20. The arrangement of the recesses 20 can improve steering stability and wet performance in a well-balanced manner.

As illustrated in FIG. 3, each recess 20 preferably has a triangular pyramid space surrounded by the inner surface 20*i* of the recess 20, a virtual extension surface of the ground contact surface 17, and a virtual extension surface of the land sidewall 18. As a result, when the ground contact pressure acts on the first land portion 13, the inner surface 20*i* of the recesses 20 in the ground contact patch can be easily grounded, and the above-mentioned effect can be surely obtained.

As illustrated in FIG. 2, in order to improve steering stability and wet performance in a well-balanced manner, the length L1 of the tire circumferential direction of the recesses 20 is preferably equal to or more than 6.5 mm, more preferably equal to or more than 7.0 mm, but preferably equal to or less than 8.5 mm, more preferably equal to or less than 8.0 mm.

As illustrated in FIG. 4, from a similar point of view, the maximum depth d1 of the recesses 20 is preferably in a range from 25% to 40%, more preferably 35% to 40%, of the maximum depth d2 of the first circumferential groove 11. The maximum length L2 of the recesses 20 in the tire axial direction is preferably in a range from 3.0 to 4.0 times the depth d1, more preferably 3.0 to 3.5 times. However, the present disclosure is not limited to such a range.

As illustrated in FIG. 3, an opening area of each recess 20 at the ground contact surface 17 is preferably greater than an opening area of the recess 20 at the land sidewall 18. This makes it easier for the inner surface 20*i* of the recess 20 to come into contact with the ground, exerting excellent steering stability.

As illustrated in FIG. 2, a vertex angle θ1 of the first edge 20*a* on the ground contact surface 17 of each recess 20 is preferably an acute angle, more preferably from 45 to 80 degrees, even more preferably from 50 to 70 degrees.

Figure 5:
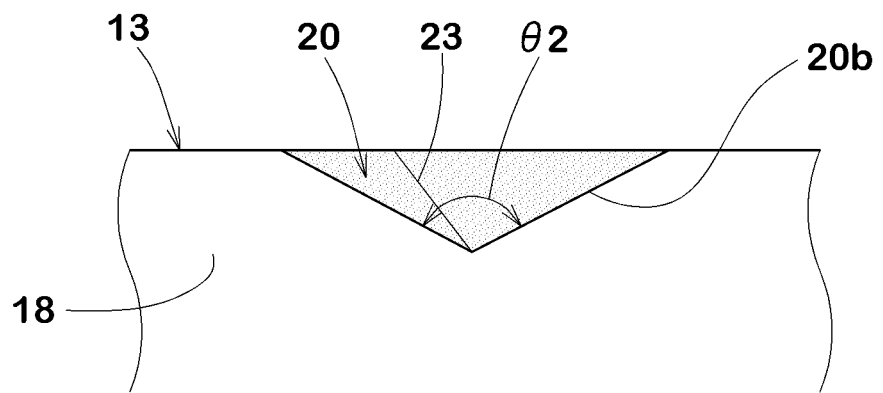
FIG. 5 is a side view of the first land portion and a recess.

FIG. 5 illustrates a side view of the first land portion 13 and one of the recesses 20. As illustrated in FIG. 5, a vertex angle θ2 of the second edge 20*b* on the land sidewall 18 of the first land portion 13, for example, is greater than the vertex angle θ1. Specifically, the vertex angle θ2 is preferably an obtuse angle, more preferably from 110 to 140 degrees, even more preferably from 120 to 130 degrees. Such a recess 20 can help to improve wet performance while maintaining the rigidity of the first land portion 13.

As illustrated in FIG. 3, the inner surface 20*i* of each recess 20 includes a first inner surface 21 and a second inner surface 22. The first inner surface 21 is connected to the second inner surface 22 through a boundary ridge 23. The first inner surface 21 has a triangle shape surrounded by an edge segment 20*a*1 of the first edge 20*a* on the ground contact surface 17 of the recess 20, an edge segment 20*b*1 of the second edge 20*b* on the land sidewall 18 of the recess 20, and the boundary ridge 23. Similarly, the second inner surface 22 has a triangle shape surrounded by an edge segment 20*a*2 of the first edge 20*a* on the ground contact surface 17 of the recess 20, an edge segment 20*b*2 of the second edge 20*b* on the land sidewall 18 of the recess 20, and the boundary ridge 23. In the present embodiment, the first inner surface 21 and the second inner surface 22 are each configured to be flat, but may be curved convexly toward the tire outer surface side, for example.

The boundary ridge 23 corresponds to the bottom of the recess 20 in each cross section when the recess 20 is cut by a virtual plane parallel to the tire circumferential direction. The boundary ridge 23 extends linearly from the apex 20*c* of the first edge 20*a* formed on the ground contact surface 17 of the recess 20 to the apex of the second edge 20*b* formed on the land sidewall 18 of the recess 20. In addition, the depth of the recess 20 continuously increases from the apex 20*c* toward the land sidewall 18. This makes it easier for the inner surface 20*i* of the recess 20 to come into contact with the ground, and excellent steering stability can be exhibited.

As illustrated in FIG. 2, in a tread plan view, the boundary ridge 23 of each recess 20 is inclined at an angle θ3 with respect to the tire axial direction. The angle θ3 of each boundary ridge 23 with respect to the tire axial direction, for example, is of from 20 to 50 degrees, preferably from 30 to 40 degrees. This makes it easier for the inner surface 20*i* of each recess 20 to come into contact with the ground when a slip angle is given to the tire 1, thus further improving steering stability.

In another embodiment, the tire 1 may have a specified orientation to be mounted on a vehicle. In this case, the first land portion 13 having the recesses 20 described above may preferably be located outside a vehicle with respect to the tire equator C when mounted on the vehicle. As a result, the recesses 20 are arranged in the region where the change in ground pressure tends to be large, so that the above effect can further be exhibited.

In the present embodiment, the first land portion 13 is provided with a plurality of termination grooves 25 extending from the second circumferential groove 12 and terminating within the first land portion 13. Such termination grooves 25 can improve wet performance while maintaining the rigidity of the first land portion 13.

From the same point of view, a groove width W1 of the termination grooves 25 is preferably smaller than the length L1 in the tire circumferential direction of the recesses 20. Specifically, the groove width W1 of the termination grooves 25 is 70% to 90% of the length L1 of the recesses 20, for example. A length L3 of the termination grooves 25 in the tire axial direction is preferably 2.0 to 3.5 times the length L2 of the recesses 20 (shown in FIG. 4).

The termination grooves 25, for example, are preferably slightly inclined at an angle with respect to the tire axial direction. The angle θ4 of the termination grooves 25 with respect to the tire axial direction is preferably in a range from 5 to 20 degrees, for example. In some more preferred embodiments, the angle θ4 of the termination grooves 25 is smaller than the angle θ3 of the boundary ridges 23 of the recesses 20 with respect to the tire axial direction. Such termination grooves 25 can moderately relax the rigidity of the tire circumferential direction of the first land portion 13. Thus, when the ground pressure acts on the first land portion 13, the inner surface 20*i* of each recess 20 can be more easily grounded.

In order to further improve the above effect, a distance L4 in the tire circumferential direction from the terminating ends 25*a* on the first land portion 13 of the termination grooves 25 to the respective apexes 20*c* of the V-shaped edges 20*a* on the ground contact surface 17 of the recesses 20 is smaller than the length L1 in the tire circumferential direction of the recesses 20. Specifically, the distance L4 is in a range from 20% to 35% of the length L1 of the recesses.

The second land portions 14 each are provided with a plurality of lateral grooves 30. The lateral grooves 30, for example, extend in the tire axial direction from the first circumferential grooves 11. In this embodiment, the lateral grooves 30 extend from the first circumferential grooves 11 outwardly in the tire axial direction beyond the tread edges Te.

In a tread plan view, the lateral grooves 30 have ends 30*a* at the first circumferential groove, and the ends 30*a* preferably face the respective recesses 20. As a result, the recesses 20 and the lateral grooves 30 can work together to improve the wet performance. As used herein, "the ends 30a faces the respective recesses 20 means that in a tread plan view, regions in which the recesses 20 are extended in parallel with the tire axial direction overlap with the respective openings of the lateral grooves 30 at the first circumferential groove 11.

Preferably, the ends 30a of the lateral grooves 30 have a groove width W2 which is greater than the length L1 of recesses 20. Specifically, the groove width W2 of the lateral grooves 30 is preferably in a range from 120% to 140% of the length L1 of the recesses 20. Such lateral grooves 30 can help to improve steering stability and wet performance in a well-balanced manner.

The lateral grooves 30, for example, extend at an angle θ5 of from 0 to 10 degrees with respect to the tire axial direction. The angle θ5 of the lateral grooves 30 with respect to the tire axial direction is smaller than the angle θ3 of the boundary ridges 23 with respect to the tire axial direction, for example. Thus, the rigidity of the second land portion 14 in the tire axial direction can be maintained, and excellent steering stability can be exhibited.

Figure 6:
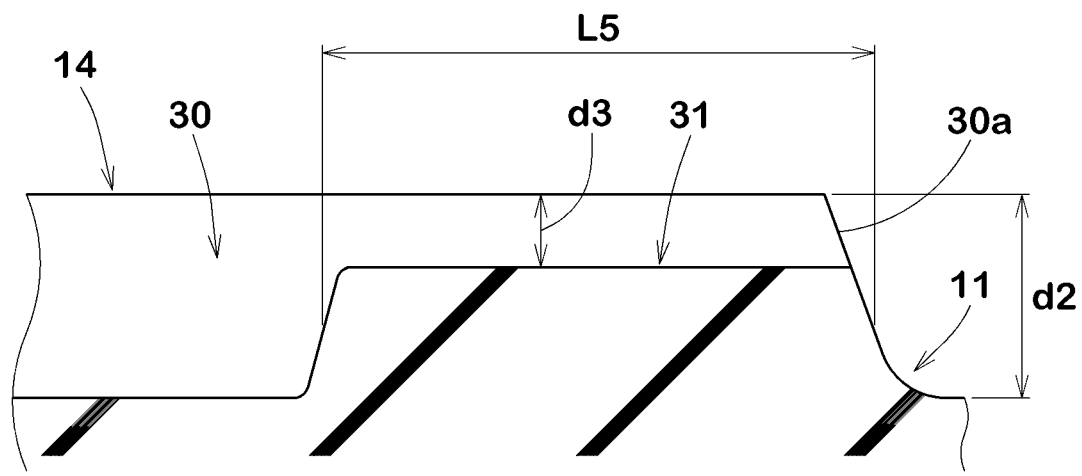
FIG. 6 is a cross-sectional view taken along the line B-B of FIG. 2.

FIG. 6 illustrates a cross-sectional view taken along the line B-B of FIG. 2. As illustrated in FIG. 6, at least one of the lateral grooves 30 is preferably provided with a tie-bar 31 in which a groove bottom thereof raises locally. In the present embodiment, the tie-bar 31 is provided in a region including the end 30a of the lateral groove 30 on the first circumferential groove 11 side. Such a tie-bar 31 can improve steering stability while maintaining wet performance.

A depth d3 from the ground contact surface of the second land portion 14 to an outer surface of the tie-bar 31 is preferably 25% to 60% of the depth d2 of the first circumferential groove 11. Further, a length L5 of the tie-bar 31 in the tire axial direction is preferably 4.0 to 11.0 times the depth d3. Such a tie-bar 31 can help to achieve a good balance between wet performance and steering stability. If the length of the tie-bar 31 in the tire axial direction changes in the tire radial direction, the length L5 shall be measured at the center position of the tie-bar 31 in the tire radial direction.

Figure 7:
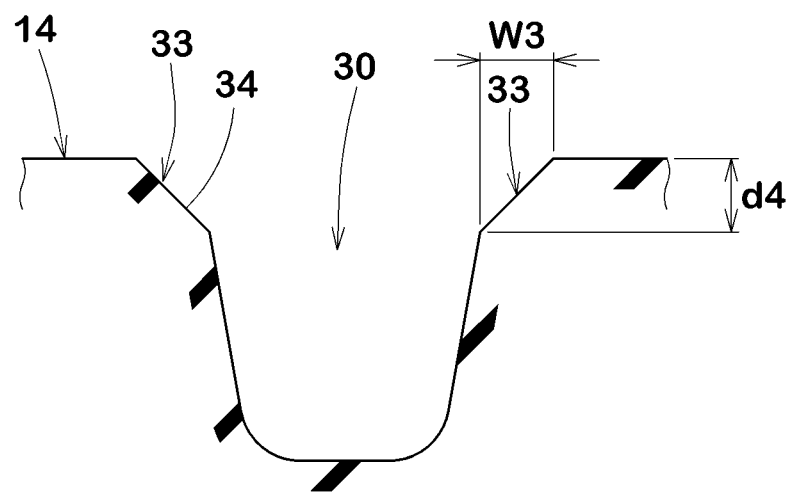
FIG. 7 is a cross-sectional view taken along the line C-C of FIG. 2.

FIG. 7 illustrates a cross-sectional view taken along the line C-C of FIG. 2. As illustrated in FIG. 7, the lateral grooves 30 each have a pair of groove edges. At least one of the pair of groove edges of at least one of the lateral grooves 30 may have a chamfer 33. In the present embodiment, each of the pair of groove edges has the chamfer 33. Each chamfer 33 includes an inclined surface 34 extending between the respect ground contact surface of the second land portion 14 and a groove wall. The lateral groove 30 with one or more chamfers 33 can mitigate the localized high ground pressure on their edges.

In a tread plan view, it is preferable that the chamfer 33 has a width W3 in a range from 1.0 to 2.5 mm, for example. A depth d4 of the chamfer 33, for example, is preferably in a range from 1.0 to 2.0 mm. The lateral grooves 30 with the chamfer 33 like this can help to improve the balance between steering stability and wet performance.

Although the tire according to one or more embodiments of the present disclosure has been described in detail above, the present disclosure is not limited to the above-mentioned specific embodiment, and may be changed to various embodiments.

EXAMPLE

As examples, pneumatic tires of size 235/35ZR19 having the basic structure shown in FIG. 1 and having the above-mentioned recesses in the first land portion were prepared. As Comparative Examples 1-6, tires with recesses having dimensions outside the scope of the present disclosure were prepared. The tires of Comparative Examples 1-6 were substantially the same as the tires of Examples except for the above items. These tires were tested for steering stability and wet performance on a dry road. The common specifications and test methods for each test tires are as follows.
Rim: 19×8.0J
Tire internal pressure: 260 kPa
Test vehicle: displacement 2000 cc, front-wheel drive
Test tire mounting position: All wheels
Steering Stability Test on Dry Road:
The steering stability when driving on a dry road surface with the test vehicle was evaluated by the driver's sensuality. The test results are indicated in Tables 1 to 3 by a score with Comparative Example 1 as 100, and the larger the value, the better the steering stability on a dry road surface.
Wet Performance Test:
The wet performance when driving on a wet road surface with the test vehicle was evaluated by the driver's sensuality. The test results are indicated in Tables 1 to 3 by a score with Comparative Example 1 as 100. The larger the value, the better the wet performance.

Tables 1 to 3 show the test results.

TABLE 1

|  | Comparative example 1 | Ex. 1 | Ex. 2 | Ex. 3 | Ex. 4 | Ex. 5 | Ex. 6 | Comparative example 2 |
|---|---|---|---|---|---|---|---|---|
| Presence or absence of recesses | presence | presence | presence | presence | presence | presence | presence | presence |
| Length L1 of recesses in tire circumferential direction (mm) | 5.5 | 7.5 | 6.0 | 7.0 | 8.0 | 8.5 | 9.0 | 9.5 |
| Depth of recesses d1/depth d2 of first circumferential groove (%) | 37 | 37 | 37 | 37 | 37 | 37 | 37 | 37 |
| Length L2 of recesses in tire axial direction/depth d1 of recesses | 3.2 | 3.2 | 3.2 | 3.2 | 3.2 | 3.2 | 3.2 | 3.2 |
| Steering stability on dry road (score) | 100 | 108 | 105 | 108 | 107 | 106 | 105 | 100 |
| Wet performance (score) | 100 | 104 | 102 | 103 | 104 | 104 | 105 | 105 |

TABLE 2

|  | Comparative example 3 | Ex. 7 | Ex. 8 | Ex. 9 | Ex. 10 | Ex. 11 | Ex. 12 | Comparative example 4 |
|---|---|---|---|---|---|---|---|---|
| Presence or absence of recesses | presence | presence | presence | presence | presence | presence | presence | presence |
| Length L1 of recesses in tire circumferential direction (mm) | 7.5 | 7.5 | 7.5 | 7.5 | 7.5 | 7.5 | 7.5 | 7.5 |
| Depth of recesses d1/depth d2 of first circumferential groove (%) | 10 | 15 | 20 | 25 | 30 | 35 | 40 | 45 |
| Length L2 of recesses in tire axial direction/depth d1 of recesses | 3.2 | 3.2 | 3.2 | 3.2 | 3.2 | 3.2 | 3.2 | 3.2 |
| Steering stability on dry road (score) | 101 | 105 | 106 | 106 | 107 | 108 | 106 | 101 |
| Wet performance (score) | 101 | 102 | 102 | 103 | 103 | 104 | 104 | 104 |

TABLE 3

|  | Comparative example 5 | Ex. 13 | Ex. 14 | Ex. 15 | Ex. 16 | Ex. 17 | Comparative example 6 |
|---|---|---|---|---|---|---|---|
| Presence or absence of recesses | presence | presence | presence | presence | presence | presence | presence |
| Length L1 of recesses in tire circumferential direction (mm) | 7.5 | 7.5 | 7.5 | 7.5 | 7.5 | 7.5 | 7.5 |
| Depth of recesses d1/depth d2 of first circumferential groove (%) | 37 | 37 | 37 | 37 | 37 | 37 | 37 |
| Length L2 of recesses in tire axial direction/depth d1 of recesses | 2.5 | 3.0 | 3.5 | 4.0 | 4.5 | 5.0 | 5.5 |
| Steering stability on dry road (score) | 101 | 105 | 108 | 108 | 106 | 105 | 101 |
| Wet performance (score) | 102 | 103 | 104 | 104 | 105 | 105 | 105 |

As shown in Tables 1 to 3, it is confirmed that Examples 1 to 17 show high scores of 105 to 108 points for steering stability on a dry road surface. On the other hand, steering stability of Comparative Examples 1, 3 and 5, was 100 to 101 points. Since Comparative Examples 1, 3 and 5 had the recesses having the sizes which are smaller than those specified in the present disclosure, these tires can be presumed that the inner surfaces of the recesses could not be sufficiently grounded to improve steering stability.

Comparative Examples 2, 4 and 6 also had the steering stability of 100 to 101 points. Since Comparative Examples 2, 4 and 6 had the recesses having the sizes which are larger than those specified in the present disclosure, the rigidity of the first land portions can be reduced, resulting in lower steering stability. As shown in Tables 1 to 3, it is also confirmed that the specific specification of the recesses in the present disclosure can improve the steering stability on a dry road surface while maintaining the wet performance.

Additional Note

The disclosure includes the following aspects.

Note 1

A tire comprising:
a tread portion being provided with a first circumferential groove extending continuously in a tire circumferential direction, and a first land portion adjacent to the first circumferential groove,
the first land portion comprising a ground contact surface, a land sidewall on a first circumferential groove side, and at least one recess that opens across both the ground contact surface and the land sidewall, wherein
the at least one recess has an opening defined by a V-shaped first edge and a V-shaped second edge respectively extending on the ground contact surface and the land sidewall,
the at least one recess has a maximum length L1 in the tire circumferential direction of from 6.0 to 9.0 mm,
the at least one recess has a maximum depth d1 of from 15% to 40% of a maximum depth of the first circumferential groove, and
the at least one recess has a maximum length L2 in a tire axial direction of from 3.0 to 5.0 times the depth d1.

Note 2

The tire according to note 1, wherein
the at least one recess has a triangular pyramid space surrounded by an inner surface of the recess, a virtual extension surface of the ground contact surface, and a virtual extension surface of the land sidewall.

Note 3

The tire according to note 1 or 2, wherein
the at least one recess has an opening area on the ground contact surface larger than an opening area on the land sidewall.

Note 4

The tire according to any one of notes 1 to 3, wherein
the tread portion is provided with a second circumferential groove extending continuously in the tire circumferential direction inside in the tire axial direction of the first circumferential groove, and
the first land portion is divided between the first circumferential groove and the second circumferential groove.

Note 5

The tire according to any one of notes 1 to 4, wherein the ground contact surface of the first land portion extends continuously in the tire circumferential direction over an entire circumference of the tire.

Note 6

The tire according to any one of notes 1 to 5, wherein the tread portion comprises a second land portion adjacent to the first land portion via the first circumferential groove, the second land portion is provided with at least one lateral groove extending in the tire axial direction from the first circumferential groove, in a tread plan view, the at least one lateral groove has an end at the first circumferential groove, and the end faces the at least one recess.

Note 7

The tire according to note 6, wherein the end of the at least one lateral groove has a groove width greater than the length L1 of the at least one recess.

Note 8

The tire according to note 6 or 7, wherein the at least one lateral groove is provided with a tie-bar in which a groove bottom raises locally.

Note 9

The tire according to any one of notes 6 to 8, wherein the at least one lateral groove has a pair of groove edges, and at least one of the pair of groove edges has a chamfer.

Note 10

The tire according to note 9, wherein the chamfer has a maximum chamfer depth smaller than the depth d1 of the at least one recess.

The invention claimed is:

1. A tire comprising:
   a tread portion being provided with a first circumferential groove extending continuously in a tire circumferential direction, a second circumferential groove extending continuously in the tire circumferential direction inside in the tire axial direction of the first circumferential groove, and a first land portion divided between the first circumferential groove and the second circumferential groove,
   the first land portion comprising a ground contact surface extending continuously in the tire circumferential direction over an entire circumference of the tire without being divided by any sipes or grooves, a land sidewall on a first circumferential groove side, and at least one recess that opens across both the ground contact surface and the land sidewall, wherein
   the land sidewall extends linearly continuously in the tire circumferential direction over the entire circumference of the tire,
   the at least one recess has an opening defined by a V-shaped first edge extending on the ground contact surface from the land sidewall and a V-shaped second edge extending on the land sidewall from the ground contact surface,
   the at least one recess has a maximum length L1 in the tire circumferential direction of from 6.0 to 9.0 mm,
   the at least one recess has a maximum depth d1 of from 15% to 40% of a maximum depth of the first circumferential groove,
   the at least one recess has a maximum length L2 in a tire axial direction of from 3.0 to 5.0 times the depth d1,
   the at least one recess comprises a plurality of recesses spaced in the tire circumferential direction,
   the first land portion is further provided with a plurality of termination grooves extending from the second circumferential groove and terminating within the first land portion,
   the plurality of termination grooves does not overlap the plurality of respective recesses in the tire circumferential direction,
   a groove width W1 of each termination groove is smaller than the maximum length L1 of the plurality of recesses,
   a length L3 of each termination groove in the tire axial direction is greater than the maximum length L2 of the plurality of recesses, and
   the plurality of termination grooves are the only openings to the second circumferential groove on the first land portion.

2. The tire according to claim 1, wherein each recess has a triangular pyramid space surrounded by an inner surface of the recess, a virtual extension surface of the ground contact surface, and a virtual extension surface of the land sidewall.

3. The tire according to claim 1, wherein each recess has an opening area on the ground contact surface larger than an opening area on the land sidewall.

4. The tire according to claim 1, wherein
   the tread portion comprises a second land portion adjacent to the first land portion via the first circumferential groove,
   the second land portion is provided with at least one lateral groove extending in the tire axial direction from the first circumferential groove,
   in a tread plan view, the at least one lateral groove has an end at the first circumferential groove, and
   the end faces the at least one recess.

5. The tire according to claim 4, wherein the end of the at least one lateral groove has a groove width greater than the length L1 of the at least one recess.

6. The tire according to claim 4, wherein the at least one lateral groove is provided with a tie-bar in which a groove bottom raises locally.

7. The tire according to claim 4, wherein
   the at least one lateral groove has a pair of groove edges, and
   at least one of the pair of groove edges has a chamfer.

8. The tire according to claim 7, wherein the chamfer has a maximum chamfer depth smaller than the depth d1 of the at least one recess.

9. The tire according to claim 1, wherein
   the plurality of recesses is spaced in the tire circumferential direction by a pitch length in the tire circumferential direction, and
   the pitch length is in a range from 4.0 to 8.0 times the length L1 of the tire circumferential direction of the plurality of recesses.

10. The tire according to claim 1, wherein a vertex angle θ1 of the first edge on the ground contact surface is in a range from 45 to 80 degrees.

11. The tire according to claim 10, wherein a vertex angle θ2 of the second edge on the land sidewall is greater than the vertex angle θ1.

12. The tire according to claim 11, wherein the vertex angle θ2 is in a range from 110 to 140 degrees.

13. The tire according to claim 1, wherein
each recess has an inner surface comprises a first inner surface, a second inner surface and a boundary between the first and second inner surfaces, and
the boundary extends linearly from an apex of the first edge formed on the ground contact surface to an apex of the second edge formed on the land sidewall.

14. The tire according to claim 13, wherein in a tread plan view, the boundary is inclined at an angle θ3 in a range from 20 to 50 degrees with respect to the tire axial direction.

15. The tire according to claim 13, wherein
the plurality of recesses is spaced in the tire circumferential direction by a pitch length in the tire circumferential direction, and
only the plurality of recesses is opened to the land sidewall.

16. The tire according to claim 1, wherein a minimum distance L4 between one of the termination grooves and an adjacent one of the plurality of recesses in the tire circumferential direction is in a range of 20% to 35% of a circumferential length L1 of the recesses.

17. The tire according to claim 1, wherein
a length L3 of the termination grooves in the tire axial direction is in a range from 2.0 to 3.5 times the maximum length L2 of the recesses.

* * * * *